United States Patent [19]

Trinh et al.

[11] Patent Number: 4,830,997

[45] Date of Patent: * May 16, 1989

[54] PROCESS FOR REGENERATING USED CATALYSTS BY MEANS OF HYDROGEN PEROXIDE AQUEOUS SOLUTION STABILIZED WITH AN ORGANIC COMPOUND

[75] Inventors: Dinh Chan Trinh, Le Vesinet; Alain Desvard, Elancourt; Germain Martino, Poissy, all of France

[73] Assignee: Institut Francais du Petrole, Rueil-Malmaison, France

[*] Notice: The portion of the term of this patent subsequent to Dec. 22, 2004 has been disclaimed.

[21] Appl. No.: 93,273

[22] Filed: Sep. 4, 1987

Related U.S. Application Data

[63] Continuation-in-part of Ser. No. 836,866, Mar. 7, 1986, Pat. No. 4,714,688.

[30] Foreign Application Priority Data

Mar. 8, 1985 [FR] France ................................. 85 03409

[51] Int. Cl.$^4$ ....................... B01J 38/62; B01J 23/94; B01J 23/92
[52] U.S. Cl. ................... 502/28; 75/101 BE; 208/216 R; 208/251 H; 208/254 H; 423/63; 423/68; 423/150; 502/12; 502/516; 502/517
[58] Field of Search ...................... 502/28, 27, 22, 26, 502/12, 516, 517; 75/101 BE; 423/63, 68, 150

[56] References Cited

U.S. PATENT DOCUMENTS

| | | | |
|---|---|---|---|
| 3,020,239 | 2/1962 | Flinn et al. | 502/28 |
| 4,098,867 | 7/1978 | Grinstead et al. | 423/63 |
| 4,234,452 | 11/1980 | Burk, Jr. et al. | 502/27 |
| 4,268,415 | 5/1981 | Mohan et al. | 502/25 |
| 4,501,820 | 2/1985 | Allan et al. | 502/28 |
| 4,714,688 | 12/1987 | Dinh et al. | 502/28 |

FOREIGN PATENT DOCUMENTS 741201 4/1970 Belgium ................. 502/28

Primary Examiner—Paul E. Konopka
Attorney, Agent, or Firm—Millen & White

[57] ABSTRACT

The process has as an object the regeneration of catalysts containing at least one contaminating metal of the vanadium, nickel and iron group. The operation is conducted as follows:

(a) The catalyst (1) is roasted in the presence of an oxygen-containing gas so as to remove at least 90% of the sulfur;

(b) The catalyst obtained in step (a) is contacted with a hydrogen peroxide aqueous solution containing at least one organic compound comprising an acidic functional group, so as to remove at least 10% of the deposited metals of the vanadium, nickel and iron group; and (c) The regenerated catalyst (11) is separated from the aqueous solution of metal ions (5). The latter can be regenerated by passage over a complexing resin (6).

The process is applicable to the regeneration of used catalysts, particularly to hydrotreatment catalysts in the oil industry.

16 Claims, 1 Drawing Sheet

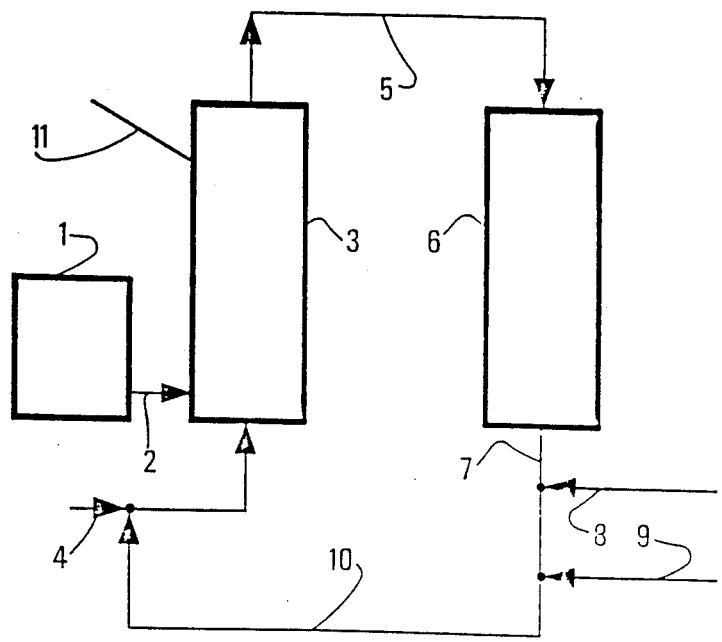

4,830,997

PROCESS FOR REGENERATING USED CATALYSTS BY MEANS OF HYDROGEN PEROXIDE AQUEOUS SOLUTION STABILIZED WITH AN ORGANIC COMPOUND

This is a continuation-in-part of application Ser. No. 836,866 filed Mar. 7, 1986 now U.S. Pat. No. 4,714,688 issued Dec. 22, 1987.

BACKGROUND OF THE INVENTION

This invention concerns a process for regenerating a catalyst at least partially deactivated after use in the treatment of a hydrocarbon charge containing at least one heteroelement from the sulfur, oxygen and nitrogen group and at least one metal from the vanadium, nickel and iron group, said deactivation resulting from the deposition of said metal on the catalyst initially formed of an inorganic carrier and at least one active metal or compound of active metal, selected from the group consisting of nickel, cobalt and molybdenum. Most often, the combinations nickel-molybdenum and cobalt molybdenum are particularly concerned.

This invention relates more particularly to the regeneration of catalysts used in the hydrotreatment and/or hydroconversion of crude oils and oil cuts of high boiling point, for example above 350° C., such as straight-run or vacuum residues, shale oils, bituminous sand, as asphalt fraction or a fraction of liquid hydrocarbons obtained by coal liquefaction, straight-run or vacuum gas-oils or even fuel oils.

It may also be used as a basic process for the recovery of substantial metal amounts from catalysts used for treating heavy oil charges. For example, by treating 16,000 m³/day of Orinoco oil, 7,000 tons of vanadium can be recovered.

During the operations of hydrotreatment (hydrodesulfurization, hydrodenitrogenation, hydrodemetallation), of hydrocracking or of catalytic cracking, the catalyst is progressively covered with deposits of coke and metals originating from the treated heavy charges.

Vanadium, nickel and iron are the three most important metals concerned but the invention is not limited to these three metals only.

The retention of metals and coke on the catalyst carrier results in a decrease of the pore volume and of the specific surface, thereby limiting the access of hydrocarbon molecules to the catalyst sites inside the catalyst particles. The catalyst activity thus decreases progressively or may be nullified when all the pores of the carrier are filled with vanadium, nickel and/or iron.

Many papers and patent applications have as their object the regeneration of catalysts poisoned by the above-mentioned metals.

In the known processes, hydrogen peroxide has often been used, either alone or as an aqueous solution, or combined with reducing washings or washings with diluted solutions of inorganic acids (nitric, sulfuric, hydrochloric acids), or associated with heteropolyacids or with basic salts as, for example, sodium carbonate.

On the other hand, vanadium and nickel extractions by aqueous solutions of hydrogen peroxide have been generally performed from these metals in the state of sulfides or directly on used and/or exhausted catalysts, or after a presulfurization with various sulfurizing agents, mostly with hydrogen sulfide, when the used catalysts do not contain a sufficient amount of sulfur.

According to the usual explanation, this presulfurization causes the metals to migrate to the surface of the catalyst particle. Vanadium and nickel extraction is accordingly easier.

U.S. Pat. No. 3,562,150 discloses vanadium extraction from thermodynamically stable vanadium sulfides ($V_2S_3$, $V_2S_5$). This patent establishes the fact that, in order to obtain the best results, vanadium extraction from the used catalysts by hydrogen peroxide solutions must be performed before the roasting step in the presence of air at 510° C., for 16 hours. When reversing the order of these two treatments, the metal extraction and the activity of the regenerated catalyst are not as good.

The commercial processes for demetallation of used catalysts, e.g., the SINCLAIR DEMET PROCESS, published in "The Oil and Gas Journal" of Aug. 27, 1962, pages 92-96 and in the article entitled "The demetallization of cracking catalysts" published in I & EC Product Research and Development, Volume 2, pages 238-332, December 1963, or in "Hydrocarbon Processing & Petroleum Refiner", volume 41, no. 7, July 1962, indicates that metals extraction by hydrogen peroxide aqueous solutions must be preceded by a presulfurization step with hydrogen sulfide.

U.S. Pat. No. 4,101,444 indicates that metal extraction by means of hydrogen peroxide must be preceded by a washing treatment with a reducing agent consisting of sulfur dioxide dissolved in water.

Finally, U.S. Pat. No. 4,268,415 states that metal extraction is directly performed from metal sulfides of used catalysts after washing with organic solvents and/or must be preceded by a previous sulfurization with hydrogen sulfide when the catalyst to be treated has an insufficient sulfur content. This patent shows that the addition of a suitable amount of hydrogen peroxide clearly improves the metal extraction by heteropolyacids.

The applicant's work has shown that the known processes suffer from many disadvantages:
substantial etching of the catalyst carrier, when the latter contains alumina or silica-alumina or a zeolite, by the sulfuric acid formed during the extraction of the metals in the sulfide state or by steam and nitric acid extraction U.S. Pat. No. 4,501,820
substantial decomposition of hydrogen peroxide to water and oxygen gas, in contact with inorganic catalyst carriers and by the extracted metal ions, making the process rather uneconomical,
reactivation only to an insufficient extent, resulting apparently from an insufficient removal of the undesirable metals.

SUMMARY OF THE INVENTION

The invention has as an object a process for regenerating catalysts with reduced consumption of hydrogen peroxide, while obtaining a high rate of metal extraction and a high rate of reactivation.

In order to reduce to a minimum or even to avoid the decomposition of hydrogen peroxide to water and oxygen gas, by contact with the catalyst carrier and with the extracted metal ions and to avoid any substantial etching of the carrier, hence obtaining an economical process for extracting the contaminating metals from the catalysts, the present invention provides a process for regenerating an at least partially deactivated sulfur-containing catalyst after its use for the hydrotreatment of a hydrocarbon charge containing at least one sulfur, oxygen and nitrogen heteroelement and at least one vanadium, nickel or iron metal, said deactivation resulting from the deposit of at least one of said metals onto the catalyst. The catalyst initially comprises an inorganic carrier and at least one active metal or compound of an active metal selected from the group of nickel, cobalt and molybdenum; said process consists essentially of the following successive steps:

(a) The catalyst is roasted in the presence of an oxygen-containing gas so as to remove at least 90% of the sulfur, (b) the catalyst obtained in step (a) is contacted with a hydrogen peroxide aqueous solution containing at least one organic compound comprising at least one acidic functional group so as to remove at least 10% of the deposited vanadium, nickel or iron metals, and (c) the regenerated catalyst is separated from the aqueous solution of metal ions.

The roasting operating conditions are so adjusted as to remove at least 90% of the sulfur, preferably at least 99%, and to reduce to a minimum the formation of metal sulfates. The metal sulfides are converted to the corresponding oxides, for example the vanadium metal sulfides are mainly converted to vanadic anhydride ($V_2O_5$).

Simultaneously, the coke or carbon deposited on the used catalyst, is eliminated. Depending on the charge and the operating conditions of the hydrotreatment the cake or carbon deposited may be about 0.1 to 20% by weight of carbon and most often about 1.0 to 10% by weight, The sulfur also deposited onto the catalyst may be equal to about 1 to 30% and preferably is 5 to 20% by weight.

Generally, the roasting temperatures range from 300° to 600° C., preferably from 450° to 550° C. Higher roasting temperatures are liable to modify the carrier structure, mainly in presence of water. So, the roasting step is performed without steam at the temperature range as above. Otherwise, the mechanical strength is considerably lowered.

The ratio of moles of oxygen gas/gram-atoms of sulfur of the metal sulfides, necessary to convert the metal sulfides to the corresponding oxides, is advantageously higher than 2, preferably equal to or higher than 10.

On the other hand, the air flow rate must be sufficient to quickly discharge the formed sulfurous and/or sulfuric anhydride to the outside of the roasting zone, thus avoiding the sulfurization of the oxides, which, as sulfates, are difficult to extract. The oxygen content and the air hourly flow rate must be sufficient to maintain at all times a sulfurous anhydride content lower than 10 ppm.

The roasting time is generally from 2 to 15 hours, preferably from 2 to 7 hours for catalysts of low sulfur content and 8 to 15 hours for catalysts of high sulfur content (higher than a few percent by weight, e.g. substantially higher than 3%).

In the presence of an aqueous solution of hydrogen peroxide and of a stabilizing organic compound, the metals, mainly present as oxides, are extracted as peroxidized ions, vanadium, for example, to a major extent as pervanadic ions $[VO(O_2)]^+$ and/or $VO_2^+$.

The stabilizing organic compound may be added to the hydrogen peroxide either before the step of contacting the catalyst with the solution or during said step.

The organic compounds comprising at least one acidic functional group may consist of carboxylic acid, acids alcohols and their mixtures. Hydrocarbon polycarboxylic acids and hydrocarbon mono-and polycarboxylic acids comprising at least one alcohol group are preferred.

Very efficient organic compounds for stabilizing hydrogen peroxide aqueous solutions in contact with catalytic carriers, providing for high extraction rates of the metals with a minimum consumption of hydrogen peroxide, are preferably selected from the group formed of salicylic acid, L(+) ascorbic acid, citric acid, maleic acid, oxalic acid and glycolic acid.

The stabilizing organic compound is used in an amount ranging for example from 0.1 gram per liter up to saturation, preferably from 2 to 10 grams per liter and more preferably from 3 to 7 grams per liter.

The aqueous solutions may contain from 0.5 to 70% by weight of hydrogen peroxide, preferably from 1 to 30% by weight and, more preferably, from 5 to 20% by weight.

The stabilized hydrogen peroxide aqueous solution according to the invention may be pumped over a catalyst fixed bed operated for example with hourly flow from 0.5 l/h to 30 l/h, preferably from 5 l/h to 20 l/h per kg of catalyst metal oxides formed after roasting, and for a time of, for example, 1 to 6 hours.

The catalyst may comprise at least one active metal or compound of active metal selected from the group of Ni, Co and Mo; Generally, it may comprise about 6 to 30% by weight of $MoO_3$, about 1 to 6% of NiO and/or about 1 to 6% of CoO. Its inorganic carrier such as conglomerates (for example balls, extrudates) has a particle diameter of at least 0.5 mm and may be alumina, silica, silica-alumina or a zeolite carrier, for example of faujasite structure.

The operation is preferably conducted in the absence of visible light and at a temperature from 0° to 80° C., preferably from 10° to 40° C., so as to avoid any substantial decomposition of hydrogen peroxide.

It may be particularly advantageous to subject the solution of metal ions obtained in step (b) to a step of contracting with a complexing resin having a complexing power for the metals of the solution, the recovered hydrogen peroxide solution being thus free of at least the major part of the metals. This solution may be reintroduced, at least partly with the hydrogen peroxide solutions, in step (b).

The metals are retained on the complexing resin as chemical complexes, generally inactive with respect to hydrogen peroxide. The complexing resin is then regenerated to recover the metals.

Various complexing resins of the trade can be used such, for example, as those sold under the trade marks DUOLITE, AMBERLITE or DOWEX whose polymer skeleton may be, for example, polyacrylic or polystyrenic and whose functional groups having complexing power with respect to the extracted metal ions are, for example, amidoxime, iminodiacetic, and/or aminophosphonic groups.

When using, for example, DUOLITE ES 346, the solution recovered at the output of the resin column contains at most 2 ppm of vanadium after a time to passage of 6 hours. With amidoxime as functional group of complexing power, the metal ions are retained on DUOLITE ES 346 as amidoximates.

Finally it has been observed that the metal complexes formed on the resin are inactive with respect to hydrogen peroxide since substantially no decomposition of hydrogen peroxide occurs.

The metal ions retained on the complexing resin may be subsequently removed by known methods.

The operating conditions for passing the solution of metal ions over the complexing resin may be the same as those stated above for the passage over the proper demetallation column, i.e. a flow rate of the solution from 0.5 to 30 liters/hour per kilogram of resin, for a time from 1 to 6 hours, preferably in the absence of light, at a temperature from 0° to 80° C., preferably from 10° to 40° C.

BRIEF DESCRIPTION OF THE DRAWING

The invention is further illustrated by the FIGURE of the accompanying drawing, showing, by way of non limitative example, a flow sheet for operation of the process.

The catalyst is roasted in a furnace (1) of known type. It is introduced, through line (2), into an opaque demetallation reactor (3), thermoregulated at room temperature, for example by water circulation.

A stabilized hydrogen peroxide aqueous solution according to the invention is fed, through line (4) to reactor (3) and scavenges the fixed bed of used catalyst.

The aqueous solution of hydrogen peroxide with the so-extracted metal ions is fed, through line (5), to an opaque retention column (6), thermoregulated at room temperature and filled with a complexing resin. The hydrogen peroxide solution recovered from the column bottom (6), through line (7), may optionally be recycled through line (10). An optional additional amount of hydrogen peroxide and of stabilizer may be added through lines (8) and (9).

The catalyst, free of the major part of its contaminating metals, is withdrawn from the demetallation column (3), through line (11).

The resin is then subjected to a regeneration step, to recover the metals.

It may be observed that the catalyst may be arranged as moving bed, expanded bed or fluid bed instead of fixed bed.

The demetallation rate DR, in percent by weight, is calculated from the determinations of the catalyst metal contents before and after extraction of the metals, by the x-ray fluorescence method. It is expressed as:

$$DR = (Qi - Qf)/Qi \times 100$$

Wherein:
Qi is the metal amount, in gram, contained in the amount of catalyst, in grams, subjected to treatment, and
Qf is the metal amount, in gram, contained in the amount of solid, by weight, remaining after extraction.

The hydrogen peroxide in aqueous solution is determined by the cerimetry method.

The hydrogen peroxide consumption, expressed in mole percent, is determined by difference between the respective contents of the solution at the input of the demetallation column and at the output of the complexing resin column. as follows:

$$\% \text{ molar consuption: } (Ni - Nf)/Ni \times 100,$$

wherein:
Ni is the total number of hydrogen peroxide moles contained in the volume of solution fed to the input of the demetallation column reactor.

Nf is the total number of hydrogen peroxide moles contained in the volume of solution recovered at the output of the complexing resin column.

The metal contents of the extraction solution are determined by the plasma spectroscopic method.

The sulfur content of the deasphalted BOSCAN oil charge, before and after the catalytic tests, has been determined by the fluorescence method.

The hydrodesulfurization rate (HDS), expressed in %, is:

$$HDS \% = (So - S)/So \times 100,$$

wherein:
So is the sulfur content of the charge, in percent, before the catalytic test, and S is the sulfur content, in percent, of the charge after the catalytic test.

The amounts of metals (nickel, vanadium and iron) of the deasphalted BOSCAN oil charge are determined by atomic absorption and their elimination rate is expressed as follows:

$$HDM \% = (Mo - M)/Mo \times 100$$

Mo and M being the respective contents of metals (nickel, vanadium and iron) in the charge before and after the catalytic test.

EXAMPLES

The following non limitative examples illustrate the invention:

EXAMPLE 1

A nickel-molybdenum catalyst, initially containing 1.75% by weight of nickel, 7% by weight of molybdenum and 0% of vanadium on a macroporous alumina inorganic carrier having a porosity of 105 cc/100 g, a specific surface of 110 m2/g and a density of 0.75 cc/g, is activated by roasting at 500° C. for 2 hours in the presence of an air stream flowing at a rate of 60 liters/hour per 300 g of catalyst, followed with a sulfurization step with a 2% by weight solution of dimethyl-disulfide in gas-oil at 350° C., at a VVH of 2, for 5 hours.

It is then used for 1,000 hours in the hydrotreatment of a deasphalted BOSCAN oil containing 550 ppm of vanadium, 60 ppm of nickel and 5.06% by weight of sulfur.

After 1,000 hours of operation, the used catalyst contains (in % by weight):

| Vanadium: | 30.9% | Nickel: | 2.89% | Molybdenum: | 2.60% |
| Iron: | 1.2% | Sulfur: | 19.5% | Carbon: | 4.5% |

According to the invention, the used catalyst (300 grams) is first roasted at 500° C. in an air flow of 60 liters/hour, for 15 hours. The sulfurous anhydride content of the gas was, at any time, lower than 10 ppm. Thus 99% of the sulfur has been removed from the used catalyst.

10 gram samples of the used catalyst, two of which unroasted and two roasted as above are each introduced into an opaque demetallation reactor, filled with polyethylene balls, as packing.

Four tests of metal extraction have been performed, for comparison purposes wherein:
A—10 grams of used and roasted catalyst is contacted with a hydrogen peroxide aqueous solution of the trade (9% by weight) stabilized with 4.5 g/l of L(+) ascorbic acid according to the invention;

B—10 grams of used and roasted catalyst is contacted with a hydrogen peroxide aqueous solution of the trade (9% by weight), in the absence of L(+) ascorbic acid;

C—10 grams of used and unroasted catalyst is contacted with a hydrogen peroxide aqueous solution of the trade (9% by weight), stabilized with 4.5 g/l of L(+) ascorbic acid;

D—10 grams of used and unroasted catalyst is contacted with a hydrogen peroxide aqueous solution of the trade (9% by weight), in the absence of L(+) ascorbic acid.

The pumping rate of the solution on the 10 grams of catalyst fixed bed is 180 millimeters per hour, for 3 hours.

The temperature of the demetallation column is regulated at 16° C.

The solution of extracted metal ions flowing out from the demetallation column passes through a second column containing 100 g of DUOLITE ES 346 as a complexing resin, also thermoregulated at 16° C.

The following table gives the tests results:

TABLE I

| Test | demetallation rate (% by weight) | | | | consumption $H_2O_2$ (mole %) | vanadium content of the solution recovered at the output of the DUOLITE ES 346 column (ppm) |
|---|---|---|---|---|---|---|
| | V | Ni | Fe | Mo | | |
| A | 85.3 | 80.2 | 75.0 | 71.0 | 33.05 | <2 |
| B | 70.8 | 53.0 | 65.3 | 65.0 | 74.26 | <2 |
| C | 80.7 | 76.2 | 70.0 | 60.8 | 82.13 | <2 |
| D | 64.8 | 46.7 | 57.2 | 60.2 | 100.00 | <2 |

This table shows that the demetallation rate, measured on the catalyst treated according to the invention (test A) is the highest and that the corresponding hydrogen peroxide consumption is the lowest.

It may also be observed that the retention of the extracted metal ions on the DUOLITE ES 346 complexing resin is substantially complete.

EXAMPLE 2

The purpose is to reuse the hydrogen peroxide solution recovered at the ouput of the column containing the DUOLITE ES 346 complexing resin.

Test A of example 1 according to the invention is repeated twice.

Each of the two recovered solutions contains 6.05% by weight of hydrogen peroxide. Their hydrogen peroxide content is adjusted to 9% by weight, by addition of perhydrol.

Two metal extraction tests, identical to test A of example 1, have been repeated in the following conditions:

Test I: without addition of L(+) ascorbic acid,

Test II: with addition of 0.243 g of L(+) ascorbic acid to the recovered 540 milliliters (i.e. 10% with respect to the initially used content at 4.5 grams/liter).

The test results are reported in Table II

TABLE II

| Test | demetallation rate (% by weight) | | | |
|---|---|---|---|---|
| | V | Ni | Fe | Mo |
| I | 83.8 | 78.2 | 75.0 | 69.0 |
| II | 85.0 | 81.2 | 75.3 | 72.1 |

The results of test II, as compared with those of test A of example 1, show that substantially equal demetallation rates can be obtained.

EXAMPLE 3

The metals extraction treatment according to mode A of example 1 is repeated with varying pumping rates of the stabilized hydrogen peroxide solution according to the invention.

The demetallation rates, as determined on the treated catalysts, are reported in table III.

TABLE III

| hourly pumping rate of the $H_2O_2$ stabilized solution (ml/hour) | Demetallation rate (% by weight) | | | |
|---|---|---|---|---|
| | V | Ni | Fe | Mo |
| 60 | 52.0 | 47.8 | 49.1 | 39.0 |
| 120 | 66.0 | 62.0 | 64.2 | 53.0 |
| 180 | 85.3 | 80.2 | 75.0 | 71.0 |
| 240 | 85.1 | 80.0 | 74.8 | 71.8 |
| 300 | 86.3 | 79.5 | 75.5 | 70.3 |

The metal extraction rate is practically at a maximum for a pumping rate of 18 liters/hour per kilogram of catalyst subjected to treatment.

EXAMPLE 4

The metal extraction treatment is repeated according to mode A of example 1 and the demetallation rates of the treated catalysts are determined versus the reaction time.

The results are reported in table IV.

TABLE IV

| Metals extraction time (hours) | demetallation rate (% by weight) | | | |
|---|---|---|---|---|
| | V | Ni | Fe | Mo |
| 1 | 44.1 | 39.6 | 40.8 | 44.0 |
| 2 | 72.2 | 63.6 | 68.0 | 68.0 |
| 3 | 85.3 | 80.2 | 75.0 | 71.0 |
| 4 | 88.9 | 82.0 | 80.0 | 77.2 |
| 5 | 93.0 | 83.7 | 82.7 | 78.4 |
| 6 | 93.7 | 83.9 | 83.5 | 79.8 |

An extraction time of, for example, 5 hours gives particularly advantageous results.

EXAMPLE 5

The metal extraction treatment according to mode A of example 1 is repeated but the tests are conducted at different temperatures. The results are given in table V.

TABLE V

| extraction temperature (0° C.) | demetallation rate (% by weight) | | | | $H_2O_2$ consumption (mole %) |
|---|---|---|---|---|---|
| | V | Ni | Fe | Mo | |
| 16 | 85.3 | 80.2 | 75.0 | 71.0 | 33.05 |
| 25 | 96.7 | 93.7 | 90.0 | 91.8 | 54.30 |

TABLE V-continued

| extraction temperature | demetallation rate (% by weight) | | | | $H_2O_2$ consumption |
|---|---|---|---|---|---|
| (0° C.) | V | Ni | Fe | Mo | (mole %) |
| 40 | 97.7 | 95.9 | 92.1 | 94.1 | 79.40 |
| 60 | 95.1 | 92.9 | 91.2 | 90.0 | 100.00 |

The results reported in table V show the advantage of extracting the metals at a temperature of at most 40° C.

EXAMPLE 6

The metals extraction treatment according to mode A of example 1 is repeated with varying concentrations of stabilized hydrogen peroxide according to the invention.

The demetallation rates and hydrogen peroxide consumptions are reported in table VI

TABLE VI

| $H_2O_2/H_2O$ concentration | demetallation rate (% by weight) | | | | $H_2O_2$ consumption |
|---|---|---|---|---|---|
| (% by weight) | V | Ni | Fe | Mo | (mole %) |
| 3 | 71.0 | 52.1 | 70.0 | 69.0 | 82.5 |
| 6 | 78.0 | 66.2 | 72.0 | 70.0 | 44.8 |
| 9 | 85.3 | 80.2 | 75.0 | 71.0 | 33.0 |
| 15 | 92.7 | 85.7 | 82.1 | 83.1 | 36.1 |
| 20 | 93.1 | 86.6 | 83.9 | 84.9 | 40.1 |
| 30 | 94.4 | 88.1 | 85.1 | 89.5 | 44.7 |

The object of the following examples 7 to 9 is to illustrate the stabilizing effect of the hydrogen peroxide aqueous solutions in the presence of various stabilizing agents according to the invention.

EXAMPLE 7

Example 1 is repeated with varying amounts of consumed stabilizing organic compound.

The results are reported in Table VII.

TABLE VII

| L (+) ASCORBIC ACID CONCENTRATION | DEMETALLATION RATE (% by weight) | | | |
|---|---|---|---|---|
| (g/l) | V | Ni | Fe | Mo |
| 0.55 | 67.5 | 62.6 | 57.0 | 52.5 |
| 2.50 | 76.2 | 71.0 | 66.0 | 60.9 |
| 4.50 | 85.5 | 80.2 | 75.0 | 71.0 |
| 6.50 | 86.2 | 80.9 | 75.9 | 70.5 |
| 12.00 | 84.3 | 79.2 | 74.5 | 68.6 |
| 14.80 | 83.9 | 78.8 | 73.2 | 68.1 |

EXAMPLE 8

In order to make sure that L(+) ascorbic acid used according to the invention to stabilize hydrogen peroxide has the same stabilizing effect with respect to inorganic carriers other than macroporous alumina of a 105 cc/100 g porosity and a 110 m²/g specific surface, example 7 has been repeated with carriers of varying nature, the hydrogen peroxide solution being stabilized at a constant concentration of 4.5 grams/liter in all the tests whose results are reported in table VIII.

TABLE VIII

| CARRIER NATURE | SPECIFIC SURFACE ($m^2/g$) | PORE VOLUME ($cm^3/100$ g) | VANADIUM DEMETALLATION RATE (% by weight) |
|---|---|---|---|
| ALUMINA | 12 | 39 | 84.2 |
|  | 90 | 65.3 | 83.2 |
|  | 230 | 60.7 | 70.4 |
|  | 110 | 105 | 85.3 |
| SILICA | 255 | 81 | 80.1 |
| SILICA-ALUMINA | 380 | 90 | 83.1 |
| ZEOLITE | 261 | 53 | 75.1 |

EXAMPLE 9

The metal extraction treatment according to mode A of example 1 is performed with the use of different stabilizing agents or mixtures thereof, at the same concentration of 4.5 grams/liter in all the tests.

The results are reported in table IX.

TABLE IX

| stabilizing agent | demetallation rate (% by weight) | | | | $H_2O_2$ consumption (mole %) |
|---|---|---|---|---|---|
|  | V | Ni | Fe | Mo |  |
| Citric acid* | 87.3 | 82.1 | 77.3 | 84.4 | 38.7 |
| Maleic acid* | 67.6 | 63.3 | 60. | 64.2 | 16.9 |
| Oxalic acid* | 79.4 | 74.5 | 71.0 | 70.1 | 18.2 |
| Salycilic acid** | 85.9 | 81.2 | 76.8 | 76.5 | 17.5 |
| Glycolic acid* | 75.1 | 70.3 | 68.3 | 67.0 | 20.1 |

*Aqueous solution of 9% by weight hydrogen peroxide content
**Aqueous solution of 20% by weight hydrogen peroxide content The stabilization of hydrogen peroxide by organic compounds always gives high demetallation rates. However the peroxide consumption balance seems to indicate that the rate of decomposition of hydrogen peroxide by the extracted metal ions, at the level of the catalyst bed subjected to extraction, depends on the nature of the stabilizing compound. The results of these tests show that the best hydrogen peroxide stabilizers, for the regeneration of catalysts contaminated by metals from the vanadium, nickel and iron group, are salicylic acid, citric acid, maleic acid, oxalic acid, L(+) ascorbic acid and glycolic acid.

EXAMPLE 10

The object of this example is to illustrate and compare the catalytic activities of catalysts initially comprising nickel, molybdenum and alumina, respectively is after use and after regeneration according to the invention. After regeneration, these catalysts have been reactivated by roasting and sulfurization in the conditions of example 1.

A deasphalted BOSCAN oil containing 550 ppm of vanadium, 60 ppm of nickel, 5.06% of sulfur, is hydrotreated in the following operating conditions: temperature of 380° to 400° C., total pressure of 100 bars, VVH of 1, hydrotreatment time of 100 hours. The nickel and vanadium hydrodemetallation rates of the charge and the hydrodesulfurization rates are reported in table X.

TABLE X

|  | nickel and vanadium demetallation rate of the charge (% by weight) | | hydro desulfurization rate of the charge (% by weight) | | physical characteristics of the catalysts | | |
| --- | --- | --- | --- | --- | --- | --- | --- |
|  | 380° C. | 400° C. | 380° C. | 400° C. | pore volume (cm³/ 100 g) | specific surface (m²/g) | density (cm³/g) |
| Fresh catalyst Ni.Mo/Al₂O₃ | 84 | 96 | 34 | 54 | 105 | 110 | 0.75 |
| Used catalyst | 43 | 55 | 27 | 40 | 5-6 | 10-15 | 2.50 |
| Catalyst regenerated according to the invention (mode A) | 69 | 85 | 30 | 49 | 86.2 | 82.1 | 0.96 |

Although the metal extraction from the used catalyst is limited, according to the invention, to 85% (mode A of example 1) the so-treated and reactivated catalyst has a pore volume and a specific surface clearly higher than those of the used catalyst.

The catalytic activity for hydrodemetallation of the charge by removing nickel and vanadium contained therein and the hydrodesulfurizing activity are close to those of the fresh catalyst. The results show the possibility of recovering, as compared with the fresh starting catalyst, a hydrodemetallation catalytic activity, with respect to nickel and vanadium of the charge of 69:84, i.e. 82% at 380° C .and 85:96, i.e. 88.5% at 400° C., and a hydrodesulfurizing activity of 30:34, i.e. 88% at 380°°C and 49:54, i.e. 90.7% at 400°°C.

Hence, the regeneration process of the invention is applicable to hydrodemetallation as well as to hydrodesulfurization of a heavy oil charge.

EXAMPLE 11

This example illustrates the activities of regenerated catalyst of example 1 initially comprising nickel and molybdenum according to the invention (test of roasting and test of metal extraction example 1, test A) after several recyclings.

After each hydrotreatment in the same operating conditions as in the example 10, except the time for the test was 1000 hours instead of 100 hours, the catalyst was regenerated and reactivated under the conditions of example 1. The same catalyst was so used four times (four recyclings).

The nickel and vanadium hydrodemetallation rates of the charge and the hydrodesulfurization rates are reported in table XI. The results show that the catalytic activities are substantially the same after four recyclings.

TABLE XI

| | | Nickel and vanadium demetallation rate of the charge (% by weight) | | Hydrosulfurization rate of the charge (% by weight) | |
| --- | --- | --- | --- | --- | --- |
| | | 380° C. | 400° C. | 380° C. | 400° C. |
| Successive recyclings of regenerated catalyst | 1st | 68 | 84 | 27 | 47 |
| | 2nd | 67.8 | 84 | 26 | 46.5 |
| | 3rd | 67.1 | 83.2 | 25 | 45.8 |
| | 4th | 66.5 | 82.5 | 24.5 | 45 |

EXAMPLE 12

This example compares the catalytic activities of catalysts initially comprising cobalt, molybdenum and alumina, respectively, fresh and regenerated according to the invention.

A Co-Mo catalyst, initially comprising 2.36% by weight of cobalt, 9.33% by weight of molybdenum, 0% by weight of vanadium and 0% by weight of nickle on a macroporous alumina inorganic carrier having a porosity of 60 cm³/100 g and a specific surface of 200 m²/g was activated in the same operating conditions as in the example 1.

It was then used in the hydrotreatment of a reduced Safanyia crude oil having a density of 0.975 g/cm³ and containing 4.15% by weight of sulfur, 6.50% by weight of asphaltenes, 12% by weight of Conradson carbon, 26 ppm of nickel, 82 ppm of vanadium, in the following operating conditions:

| | | |
| --- | --- | --- |
| VVH = 0.3 | T = 385° C. | P = 140 bars |
| H₂/hydrocarbons = 1000 1/1 | | |
| Hydrotreatment time = 8000 hours. | | |

After 8000 hours of operation, the used catalyst contained (in % by weight):

| | | | |
| --- | --- | --- | --- |
| sulfur: | 12% | Carbon: | 15.5% |
| Vanadium: | 10.5% | Nickel: | 4.50% |

According to the invention as in example 1 (step of roasting and step of metal extraction test A, example 1), the catalyst was regenerated and the demetallation rate of the catalyst was the following:

| | | | |
| --- | --- | --- | --- |
| Vanadium: | 84.7% | Cobalt: | 74.9% |
| Nickel: | 81.2% | Molybdenum: | 69.8% |

The catalyst was then reactivated by roasting and sulfurization as in example 1 for another hydrotreatment of the same Safanyia oil under the same conditions as above.

The hydrodesulfurization rate and the nickel and vanadium hydrodemetallation rate of the charge are reported in Table XII.

TABLE XII

| | Hydrodesulfurization rate of the charge (% by weight) | Hydrodemetallation rate of the charge (% by weight) | |
|---|---|---|---|
| | | Ni | V |
| Hydrotreatment time (hours) | 8000 | 8000 | 8000 |
| Fresh catalyst | 72 | 4.5 | 10.5 |
| Regenerated catalyst | 69.5 | 4.1 | 9.6 |

EXAMPLE 13

The same used catalyst as in the example 1 was regenerated according to, test A of example 1 except that ascorbic acid was replaced by nitric acid in the same molar concentration.

After demetallation, the catalyst was separated from the aqueous phase. The analysis of the filtrate by atomic absorption showed that 8.3% of the alumina carrier was dissolved.

For comparison, it has been checked with the oxalic acid, the L(+) ascorbic acid, the citric acid, the maleic acid, the salycilic acid and the glycolic acid that the carrier was not substantially attacked.

What is claimed as the invention is:

1. A process for regenerating an at least partially deactivated sulfur-containing catalyst after its use for the hydrotreatment of a hydrocarbon charge containing sulfur, and at least one vanadium, nickel or iron metal, said deactivation resulting from the deposit of at least one of said metals onto the catalyst, said catalyst initially comprising an inorganic carrier and at least one active metal or compound of an active metal selected from the group consisting of nickel, cobalt and molybdenum, said process consisting essentially of the following successive steps:
   (a) the sulfur-containing deactivated catalyst is roasted in the presence of an oxygen-containing gas at 300°-600° C., so as to remove at least 90% of the sulfur,
   (b) the catalyst obtained in step (a) is contacted with a hydrogen peroxide aqueous solution containing at least one organic compound comprising a stabilizing amount of a carboxylic acid, a carboxylic acid having at least one alcohol group, or a mixture thereof so as to remove at least 10% of the deposited vanadium, nickel or iron metals, and
   (c) the regenerated catalyst is separated from the hydrogen peroxide aqueous solution.

2. A regeneration process according to claim 1, wherein the organic compound is a mono-carboxylic acid, a mono-carboxylic acid having at least one alcohol group, a poly-carboxylic acid having at least one alcohol group, or a mixture thereof.

3. A regeneration process according to claim 1, wherein the organic compound is selected from the group consisting of L(+) ascorbic acid, citric acid, salicylic acid, maleic acid, oxalic acid and glycolic acid.

4. A regeneration process according to claim 1, wherein the inorganic carrier of the catalyst is alumina, silica, a silica-alumina or a zeolite carrier.

5. A regeneration process according to claim 1, wherein the catalyst roasting step is conducted with an oxygen-containing gas providing at least 2 moles of oxygen per gram-atom of sulfur and at such a flow rate that sulfur dioxide formed during roasting is, at any time, lower than 10 ppm.

6. A regeneration process according to claim 1, wherein the hydrogen peroxide concentration in water is from 0.5 to 70% by weight, the concentration of organic compound from 0.1 gram per liter up to saturation and the extraction temperature of the metals from 0° to 80° C.

7. A regeneration process according to claim 1, wherein the hydrogen peroxide concentration in water is from 1 to 30% by weight, the organic compound concentration from 2 to 10 grams per liter and the temperature from 10° to 40° C.

8. A regeneration process according to claim 1, wherein step (b) is performed in the absence of light, at a flow rate of 0.5 to 30 liters per hour of hydrogen peroxide solution per kilogram of roasted catalyst, for 1 to 6 hours.

9. A regeneration process according to claim 1, wherein the hydrogen peroxide aqueous solution in step (c) is thereafter contacted with a complexing resin having a complexing power for the metals of the solution, and the recovered hydrogen peroxide solution is free of at least the major part of the metals.

10. A regeneration process according to claim 1, wherein the aqueous solution of metal ions separated in step (c) is thereafter contacted with a complexing resin comprising at least one functional group having a complexing power for ions of metals from the vanadium, nickel and iron group, at a flow rate of 0.5 to 30 liters per hour per kilogram of resin, for 1 to 6 hours and at a temperature of 0° to 80° C., and wherein the complexing resin is thereafter subjected to a regeneration step for recovering the metals therefrom.

11. A process according to claim 5, wherein the roasting temperature is about 450°-550° C., the ratio of moles of oxygen gas/gram-atom of sulfur is at least 10, and the roasting time is 2–7 hours for catalysts of a sulfur content of about 3% by weight or less and is 8–15 hours for catalysts of a sulfur content higher than about 3% by weight.

12. A process according to claim 1, wherein said catalyst comprises nickel and molybdenum as active metals.

13. A process according to claim 1, wherein said catalyst comprises cobalt and molybdenum as active metals.

14. A process according to claim 1, wherein said roasting step is conducted essentially in the absence of steam.

15. A process according to claim 1, wherein said catalyst is arranged as fixed bed, fluid bed, moving bed or expanded bed.

16. A process according to claim 1, wherein the hydrocarbon charge further contains oxygen or nitrogen heteroelements.

* * * * *